United States Patent
Baldini et al.

(10) Patent No.: US 8,909,217 B2
(45) Date of Patent: Dec. 9, 2014

(54) WIRELESS INTERNET RADIO SYSTEM AND METHOD FOR A VEHICLE

(75) Inventors: Massimo Baldini, Beverly Hills, MI (US); Thomas R. Denton, Orion, MI (US); Jacob R. Sigal, Ferndale, MI (US)

(73) Assignee: Myine Electronics, Inc., Ferndale, MI (US)

( * ) Notice: Subject to any disclaimer, the term of this patent is extended or adjusted under 35 U.S.C. 154(b) by 309 days.

(21) Appl. No.: 13/444,613

(22) Filed: Apr. 11, 2012

(65) Prior Publication Data

US 2012/0264415 A1  Oct. 18, 2012

Related U.S. Application Data

(60) Provisional application No. 61/476,101, filed on Apr. 15, 2011.

(51) Int. Cl.
| | |
|---|---|
| H04W 4/00 | (2009.01) |
| H04H 60/09 | (2008.01) |
| H04H 40/00 | (2008.01) |
| H05K 11/00 | (2006.01) |
| H04M 3/42 | (2006.01) |
| H04M 1/00 | (2006.01) |
| H04B 1/18 | (2006.01) |
| H04B 1/02 | (2006.01) |
| H04L 12/66 | (2006.01) |
| H04M 1/725 | (2006.01) |
| H04M 1/60 | (2006.01) |
| H04B 1/38 | (2006.01) |

(52) U.S. Cl.
CPC ........ *H04M 1/6091* (2013.01); *H04M 1/72522* (2013.01); *H04M 2250/02* (2013.01); *H04B 1/3822* (2013.01); *H04W 4/00* (2013.01)

USPC ..... 455/426.1; 455/3.02; 455/3.03; 455/41.2; 455/92; 455/93; 455/99; 455/344; 455/345; 455/188; 455/152.1; 455/151.1; 455/414.12; 455/569.2; 455/575.9; 370/352; 370/353; 370/356; 342/122; 381/86

(58) Field of Classification Search
USPC ............ 455/42, 93, 99, 130, 230, 343.1, 420, 455/550.1, 566
See application file for complete search history.

(56) References Cited

U.S. PATENT DOCUMENTS

| | | |
|---|---|---|
| 6,314,094 B1 | 11/2001 | Boys |
| 6,381,314 B1 | 4/2002 | Walinski |
| 6,389,463 B2 | 5/2002 | Bolas et al. |
| 6,591,085 B1 | 7/2003 | Grady |
| 6,631,098 B2 | 10/2003 | Chang et al. |
| 6,654,367 B1 | 11/2003 | Kaufman |

(Continued)

*Primary Examiner* — Inder Mehra
(74) *Attorney, Agent, or Firm* — Harness, Dickey & Pierce, P.L.C.

(57) ABSTRACT

An apparatus for wirelessly connecting a smartphone to a remote FM radio system, for controlling playback of audio content delivered wirelessly to the smartphone via a wide area network, on the remote FM radio system. An apparatus housing receives a DC power signal from a remote DC power source. A control panel has a display and controls for controlling playback of the audio content on the remote FM radio system, at least one of the controls performing a function in common with a playback control appearing on a display of the smartphone. An electronic subsystem communicates with the control panel and wirelessly receives audio content from the smartphone, and communicates the audio content as an FM signal via a user playback command input at the controls of the control panel, to the remote FM radio system.

20 Claims, 3 Drawing Sheets

(56) References Cited

U.S. PATENT DOCUMENTS

| | | |
|---|---|---|
| 6,741,869 B1 | 5/2004 | Lehr |
| 6,920,479 B2 | 7/2005 | McDowall et al. |
| 7,062,442 B2 | 6/2006 | Berg et al. |
| 7,167,765 B2 | 1/2007 | Janik |
| 7,188,087 B1 | 3/2007 | Goldstein |
| 7,191,193 B2 | 3/2007 | Ben-Yaacov et al. |
| 7,206,500 B1 | 4/2007 | Novak et al. |
| 7,233,948 B1 | 6/2007 | Shamoon et al. |
| 7,280,802 B2 * | 10/2007 | Grady ............... 455/42 |
| 7,301,939 B2 | 11/2007 | Boys |
| 7,916,579 B1 * | 3/2011 | Treyz et al. ............... 368/10 |
| 2002/0002039 A1 | 1/2002 | Qureshey et al. |
| 2002/0072326 A1 | 6/2002 | Qureshey et al. |
| 2003/0076955 A1 | 4/2003 | Alve et al. |
| 2005/0169114 A1 | 8/2005 | Ahn |
| 2006/0067304 A1 | 3/2006 | McDowall et al. |
| 2006/0168097 A1 | 7/2006 | Pittelli |
| 2006/0281477 A1 | 12/2006 | Downes |
| 2007/0097689 A1 * | 5/2007 | Barausky et al. ............. 362/287 |
| 2007/0101039 A1 | 5/2007 | Rutledge et al. |
| 2007/0130074 A1 | 6/2007 | Goldstein |
| 2007/0211579 A1 | 9/2007 | Yoshimura et al. |
| 2008/0010372 A1 | 1/2008 | Khedouri et al. |
| 2008/0019339 A1 | 1/2008 | Raju et al. |
| 2008/0026720 A1 | 1/2008 | Marji |
| 2010/0131691 A1 * | 5/2010 | Chatterjee et al. ............. 710/303 |
| 2011/0275416 A1 * | 11/2011 | Chang et al. ................. 455/566 |
| 2011/0299697 A1 * | 12/2011 | Sawai ............... 381/79 |

* cited by examiner

US 8,909,217 B2

WIRELESS INTERNET RADIO SYSTEM AND METHOD FOR A VEHICLE

CROSS-REFERENCE TO RELATED APPLICATIONS

This application claims the benefit of U.S. Provisional Application No. 61/476,101, filed on Apr. 15, 2011. The entire disclosure of the above application is incorporated herein by reference.

FIELD

The present disclosure relates to Internet radio systems, and more particularly to a system and method for enabling command and control of Internet radio applications, including reacting to ads and/or promotions being played as part of, or added to the Internet radio broadcast, being accessed through a smartphone device from a portable control component, where the portable control component can be used to wirelessly interface the smartphone to a vehicle's AM/FM radio to provide a convenient means for the vehicle operator to control the Internet radio application without the need to manually access the smartphone.

BACKGROUND

In one aspect the present disclosure relates to an apparatus for wirelessly connecting a smartphone to a remote FM radio system. The apparatus enables control of playback of audio content delivered wirelessly to the smartphone, via a wide area network, on the remote FM radio system. The apparatus may comprise a housing adapted to receive a DC power signal from a remote DC power source. A control panel may be included which has a display and a plurality of controls for controlling the playback of the audio content on the remote FM radio system. At least one of the controls may perform a function in common with a playback control appearing on a display of the smartphone. An electronic subsystem may be in communication with the control panel and adapted to wirelessly receive audio content from the smartphone, and to communicate the audio content as an FM signal, in accordance with one or more user playback commands input at the controls of the control panel, to the remote FM radio system.

In another aspect the present disclosure relates to an apparatus for wirelessly connecting a smartphone to a remote FM radio system. The apparatus enables playback of audio content delivered wirelessly to the smartphone via a wide area network, on the remote FM radio system. The apparatus may comprise a housing adapted to receive a DC power signal from a remote DC power source. A control panel may be included which has a plurality of controls for controlling the playback of the audio content on the remote FM radio system. At least one of the controls may perform a function in common with a playback control appearing on a display of the smartphone. An FM modulator may be included which is tunable to a desired FM frequency to match a frequency that the FM radio is tuned to. A wireless communications transceiver may be included which is adapted to automatically establish a wireless communications link with the smartphone when the smartphone is placed within a predetermined proximity of the apparatus. A controller may be used which is in communication with the FM modulator, the wireless communications transceiver and the control panel. The controller may be configured to receive the audio content from the wireless communications transceiver and to convert the audio content to an equivalent modulated FM signal for transmission by the FM modulator to the remote FM radio system.

In still another aspect the present disclosure relates to a method for wirelessly connecting a smartphone to a remote FM radio system. The method may be used for controlling a playback of audio content delivered wirelessly to the smartphone via a wide area network, on the remote FM radio system. The method may comprise using a housing having a power cord to receive a DC power signal from a remote DC power source. A device having a control panel with a plurality of controls, and a display, may be used to control the playback of the audio content on the remote FM radio system. At least one of the controls may operate to perform a function in common with a playback control appearing on a display of the smartphone. The method may further include establishing a first wireless communications link between the smartphone and the device to receive audio content from the smartphone, which the smartphone has received over a wide area network. A second wireless communications link may be established between the device and the remote FM radio system, and used to enable the device to transmit the audio content as an FM signal to the remote FM radio system.

BRIEF DESCRIPTION OF THE DRAWINGS

The drawings described herein are for illustration purposes only and are not intended to limit the scope of the present disclosure in any way.

DETAILED DESCRIPTION

Figure 1:
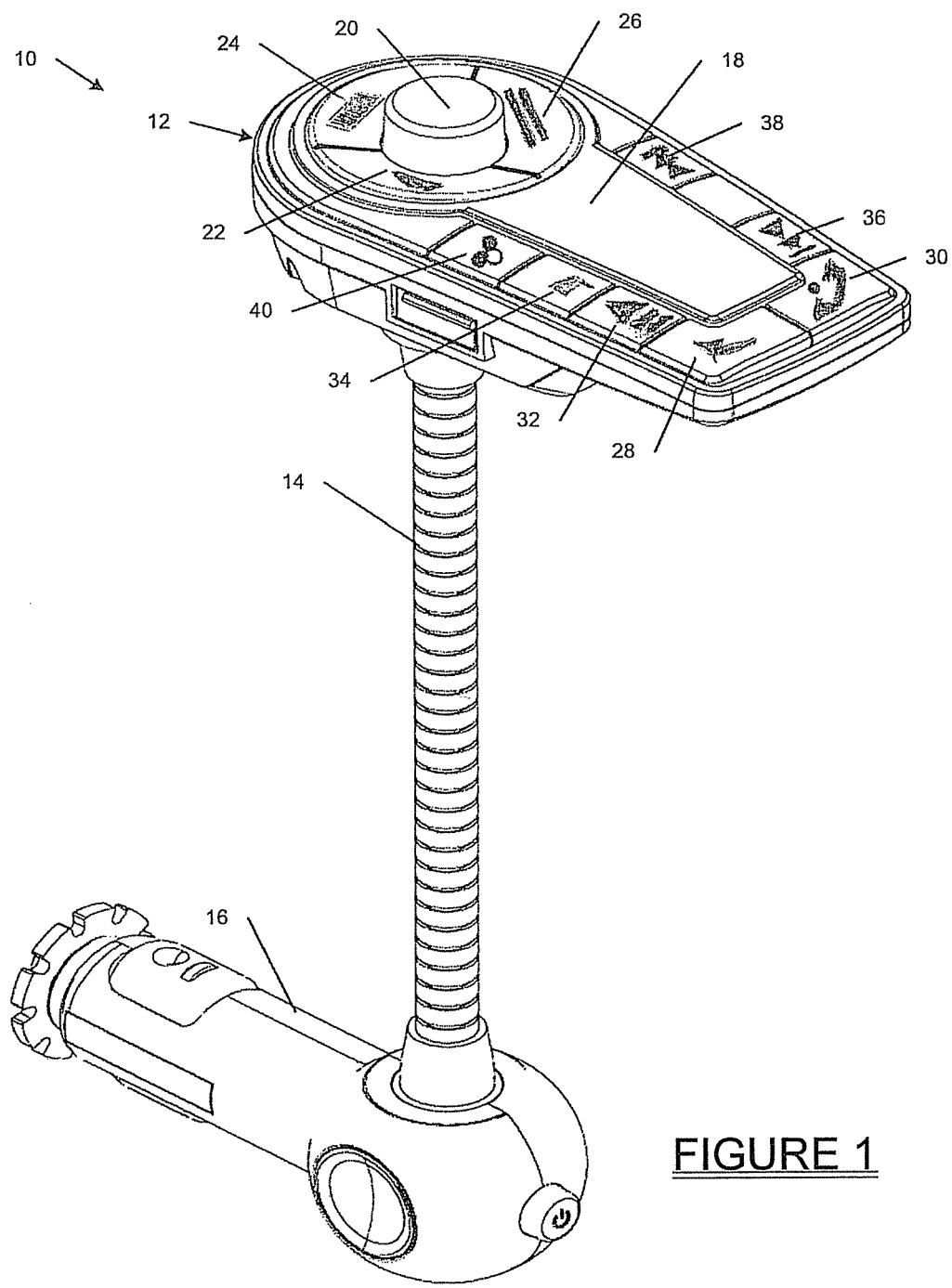
FIG. 1 is a front elevation view of a control device in accordance with one embodiment of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, there is shown a command and control device 10 (hereinafter simply "device 10") for wirelessly interfacing a smartphone to an AM/FM radio of a motor vehicle, and allowing convenient control of the various functions of the smartphone from the device 10. The device 10 includes a plurality of controls that are physically larger and more easily accessed by a user as compared to their counterpart controls on a typical smartphone. The device 10 includes a housing 12 having a flexible power cord 14 with a cigarette lighter adapter plug 16 that may be plugged into a +12 volt receptacle, for example the receptacle used for forming a cigarette lighter jack, or alternatively an auxiliary power jack, of the vehicle. The power cord 14 has an outer plastic or metal sheath that is flexible but which has a well known memory style construction. The memory style construction enables the plastic or metal sheath to retain its shape once it is bent or otherwise articulated into a desired bend or contour. Thus, the power cord 14 is able to bend such that the device 10 can be angled toward the user when the user is seated in the vehicle and the power cord 16 is plugged into the +12 volt receptacle. The power cord 14 essentially supports the housing 12 in the orientation desired by the user so that the various controls on the device 10 are easily and conveniently accessible by the user. This provides a significant degree of convenience to the user as compared to the user having to pick up his/her smartphone and enter commands from the smartphone.

The housing 12 of the device 10 may include a display 18, which may be a LED display or any other suitable form of alphanumeric display. A combination control dial/button 20 may be used to tune an internal RF modulator of the device 10 to a desired, unused FM frequency. Tuning the vehicle's AM/FM radio to the same unused frequency enables the device 10 to communicate wirelessly via an RF signal with the vehicle's AM/FM radio so that Internet radio content can be transmitted to and played back on the vehicle's AM/FM radio.

The housing 12 also includes a standard "Play" button 22, a "Pause" button 24 and a "Stop" button 26 for controlling the playback of Internet radio content supplied by the smartphone to the vehicle's AM/FM radio. Additional controls may include a "Call Pickup" button 28, a call "Hang up" or disconnect button 30, a "Similar" button 32, a "Tag" button 34, a "Seek Forward" button 36 and a "Seek Backwards" button 38. An "Auto Launch" button 40 may be included that configures the device 10 to automatically launch the user's Internet radio application on his/her smartphone when a wireless signal, such as a BLUETOOTH® communications protocol wireless signal, is detected from a smartphone. Thus, when the device 10 is plugged into the vehicle's+12 volt receptacle, and a user enters the vehicle with his/her smartphone powered on, the device 10 will automatically detect the BLUETOOTH® communications protocol wireless signal being transmitted from the user's smartphone and will establish a wireless communications link with the user's smartphone, as well as automatically turn on the Internet radio application on the user's smartphone. In this manner, the device 10 may assist in providing Internet radio content automatically in the vehicle such that the interface is transparent to the vehicle occupant and radio operation is otherwise largely conventional.

It is a principal advantage of the device 10 that it requires no external hard wiring to the user's smartphone, and no action by the user to start the Internet radio application on his/her smartphone when the user enters the vehicle. If the device 10 is plugged in to the vehicle's+12 volt receptacle, when the user turns on the vehicle's ignition while his/her smartphone is on his/her person and operating, the device 10 will automatically establish a wireless BLUETOOTH® communications protocol link with the smartphone. It is also a significant feature that the device 10 will also automatically start the Internet radio application on the smartphone, or will automatically cause operation of an Internet radio application that has been stopped or paused, when a user re-enters the vehicle. If the device 10 and vehicle radio are both tuned to the same unused frequency, Internet radio content may immediately begin playing over the vehicle's audio system. The user may then place his/her smartphone on an adjacent seat, in the vehicle's console or glovebox, or in a coat pocket, purse, handbag or in any other nearby, convenient location. From this point on, the device 10 enables the user to conveniently control the selection and playback of Internet radio content without the need to physically handle and make control selections from his/her smartphone. This is a significant advantage, especially when operating a motor vehicle.

The Tag button 34 also forms a significant feature of the device 10. The Tag button 34 may be used in the conventional way to tag a song and/or an ad/promotion that is currently playing on the user's smartphone through the vehicle's AM/FM radio. The Tag command essentially generates a designation for the specific song or ad/promotion that the user is listening to on the AM/FM radio of the vehicle, and this designation essentially operates as a command that is sent back to the user's smartphone. The command causes the smartphone to save meta data associated with the song and/or an ad/promotion that the user is listening to on the AM/FM radio, in a non-volatile memory of the user's smartphone. At some later time the user may select the song and/or an ad/promotion to act on it (such as to purchase the tagged song). This is a significant feature because if the user is operating the vehicle and a song or advertisement that the user wants to tag begins playing on the vehicle's AM/FM radio system, the user can easily and conveniently access the device 10 to input the tag command. This may save the user from the need to pull off the road, come to a stop, and then access his/her smartphone, just to input the tag command.

The Similar button 32 is also used in the conventional way to command the smartphone to search for similar songs (e.g., of a certain genre, certain artist, certain group, etc.).

The control dial/button 20 enables multiple functions to be controlled from it. In a first configuration the dial/button 20 forms a frequency tuning dial that can be rotated to allow the user to select a certain frequency for use with the vehicle's radio. The display 18 displays the frequency as the user rotates the dial/button 20 to the desired, unused frequency. When the dial/button 20 is pushed, it then operates as a rotary volume control to control the volume (i.e., gain) of the signal being output from the smartphone. Thus, the user may control the volume of Internet radio content being played over the vehicle's audio system either by the dial/button 20 as well as the vehicle's own volume control. Pushing the dial/button 20 again toggles the function back to a rotary frequency tuning function.

Figure 2:
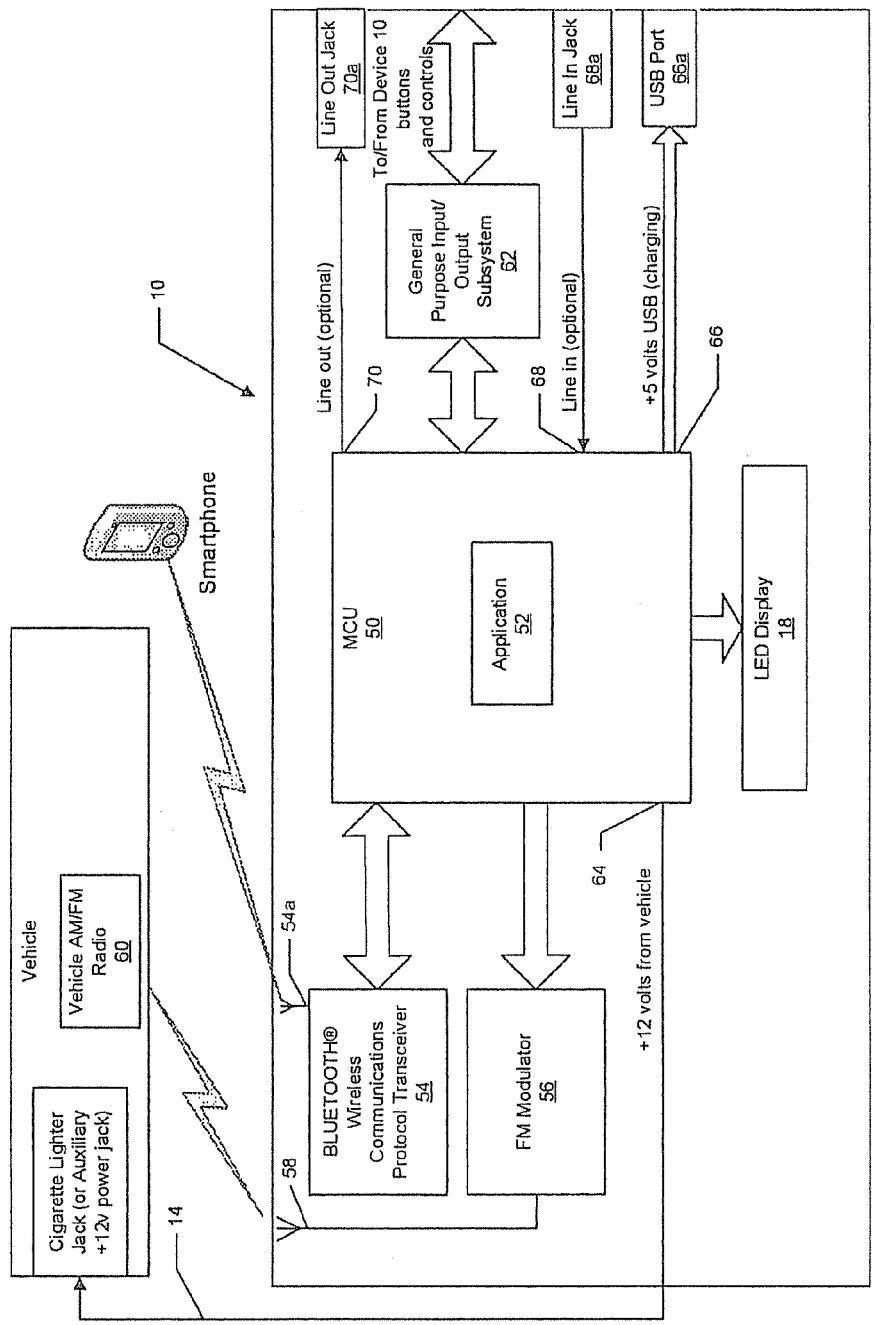
FIG. 2 is a high level block diagram showing various electronic components housed within the device shown in FIG. 1.

Referring to FIG. 2, the device 10 may include a micro controller unit (MCU) 50 that has a control application 52 stored in an internal memory of the MCU. The memory may be either a random access memory or a read only memory, or any other suitable form of memory. The control application 52 may comprise an application program interface (API) that controls the transfer of packets of information, as well as the handshaking, between the device 10 and the user's smartphone. The application 52 is described in detail in the Appendix of the present application. The MCU 50 may be any suitable form of micro controller unit, for example an STC-10L12XE micro controller.

The device 10 also includes a BLUETOOTH® wireless communications protocol transceiver 54 having its own antenna 54a, which is controlled by the MCU 50 to enable wireless communications over a BLUETOOTH® wireless communications protocol link with the user's smartphone. An FM modulator 56 is included which is controlled by the MCU 50 to modulate an FM signal, at the user set frequency, via an antenna 58 to the vehicle's car radio 60. The MCU 50 is also in bidirectional communication with a general purpose input/output subsystem 62 that provides the electronic interface with the buttons and controls described above in connection with FIG. 1. The MCU 50 also has a power input port 64 for receiving a +12 volt signal from the vehicle's+12 volt receptacle via its power cord 14. An output port 66 provides a +5 volt USB charging signal to a user accessible USB port 66a that may be used to charge the smartphone or any other portable electronic device having a USB port. An "Line In" port 68 may be included which receives as an input, at jack 68a, the audio output from an external electronic device (not shown) via a suitable cable. This causes the audio sent from the BLUETOOTH® communications protocol transceiver 54 to be bypassed. A "Line out" port 70 may be in communication with a jack 70a, which may be coupled to some external electronic device (not shown). When using the Line out port 70, the device 10 may automatically send audio from the MCU 50 to the Line out port 70 and turn off the FM Modulator 56.

Figure 3:
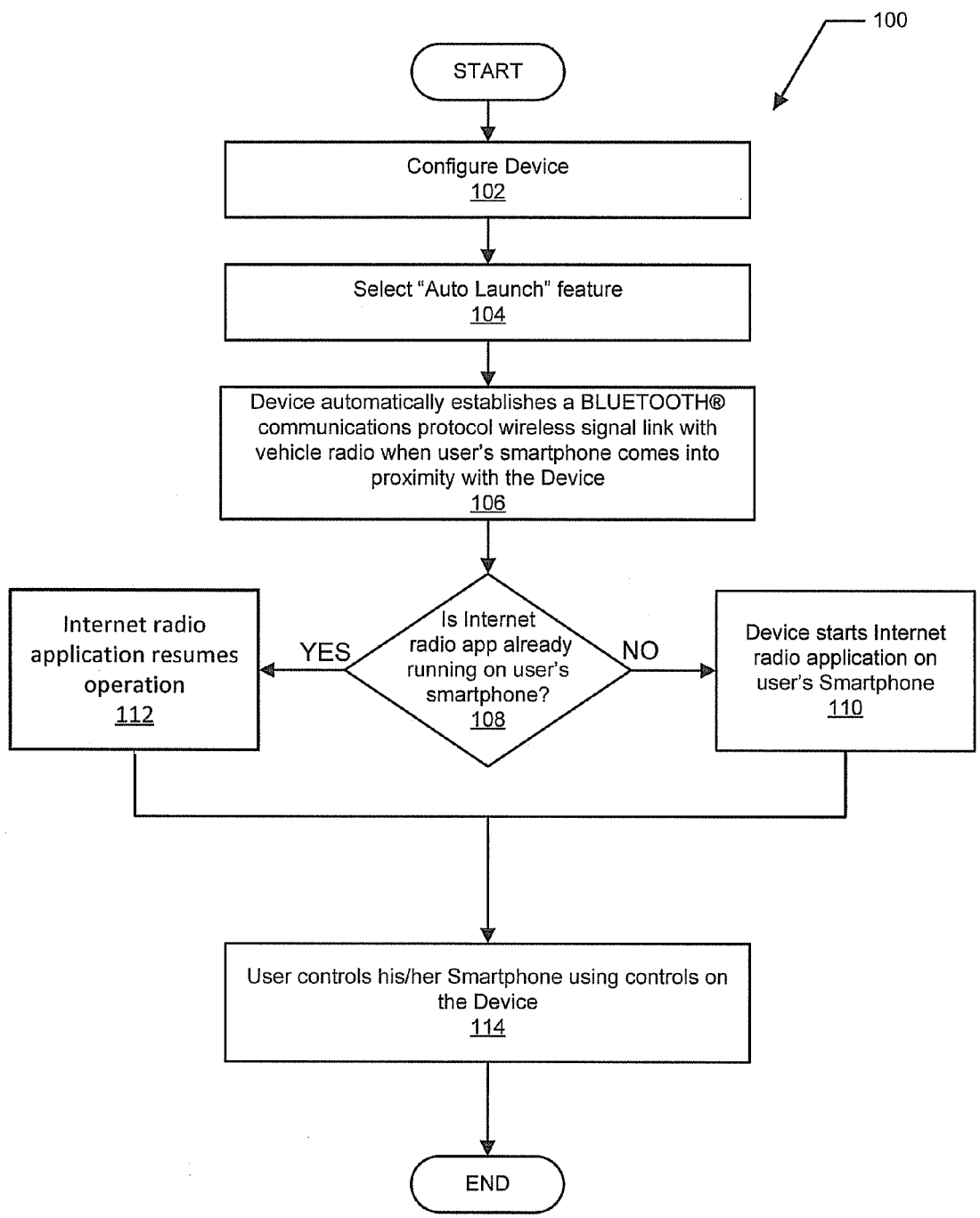
FIG. 3 is a high level flowchart illustrating major operations performed by the device of FIG. 1 in connection with use of a smartphone.

Referring to FIG. 3, a flowchart 100 is shown that sets forth one exemplary sequence of operations in using the device 10. At operation 102 the user configures the device 10. This involves plugging the power plug 16 into the vehicle's+12 v receptacle, then tuning the device 10 to an unused frequency, and then tuning the vehicle's radio 60 to the same unused frequency. At operation 104 the user may select the "Auto Launch" feature from button 40 (FIG. 1). The device 10 will thereafter automatically establish a BLUETOOTH® wireless communications protocol link with the user's smartphone when the smartphone comes into proximity with the device 10. At operation 106, when the user enters his/her vehicle at some later time and turns on the ignition (assuming the device 10 is installed in the vehicle and the user's smartphone is powered on), the device 10 will automatically establish a wireless communications link with the user's smartphone. At operation 108 the wireless communications link that was just established by the device 10 with the user's smartphone will cause the smartphone to make a check if an Internet application is currently running on the user's smartphone. If no such application is currently running, then the device 10 will cause the smartphone to automatically launch the default Internet radio application that is preset on the user's smartphone (assuming the Auto Launch feature has been selected on the device 10 via button 40), as indicated at operation 110. If the user's smartphone already has an Internet radio application already turned on (but in a paused or "stop" state), then the device 10 will cause the smartphone to automatically resume playing the Internet radio content that the user is listening to on his/her smartphone over the vehicle's audio system, as indicated at operation 112. This is assuming, of course, that the vehicle's AM/FM radio is turned on and set to the unused FM frequency. If the vehicle is idling and the user then enters the vehicle with his/her smartphone turned on, then the user may simply press the Auto Launch button 40, which signals the device 10 to establish a BLUETOOTH® protocol wireless communications link with his/her smartphone and commands the device 10 to automatically start the Internet radio application on the user's smartphone. At operation 114 the user may control the volume and selection of Internet radio content being supplied by the smartphone using any of the controls on the device 10. If a call is received by the user on the smartphone, the application 52 may operate to automatically mute the Internet radio content while the call is in place. The received audio of the caller may then be played over the vehicle's audio system. When the call is ended the playing of Internet radio content is resumed.

The device 10 thus forms a highly convenient and easy to use control device for controlling the various functions of a smartphone that are associated with the playback or selection of Internet radio content. This allows the driver to access the controls of the device 10 in a much more convenient manner than would otherwise be possible if the user had to manually pick up his/her smartphone and access the corresponding controls from the smartphone. A principal advantage is that the establishment of a wireless communications link between the device 10 and the user's smartphone, and the starting of the Internet radio application on the user's smartphone, may both be done automatically without any manual commands being invoked by the user.

The device 10 also has the ability to work across virtually any communication link between a smartphone and external hardware device. The device 10 is also highly efficient in design and operation, as well as easily handled and transported. The device 10 is electrically connected to a vehicle with only a single connection, that being the vehicle's+12 volt receptacle, and thus can be quickly and easily removed, and even stored in the vehicle's console or glove box, if necessary.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An apparatus for wirelessly connecting a smartphone to provide audio content received by the smartphone to a remote FM radio system of a vehicle, for playback over the remote FM radio system, and for controlling a playback of the audio content delivered wirelessly to the smartphone via a wide area network, on the remote FM radio system, the apparatus comprising:
   a housing adapted to receive a DC power signal from a remote DC power source;
   a control panel having a display and a plurality of controls for controlling the playback of the audio content on the remote FM radio system, at least one of the controls performing a function in common with a playback control appearing on a display of the smartphone;
   a first electronic subsystem in communication with the control panel and adapted to establish a wireless communications link with the smartphone to wirelessly receive audio content from the smartphone; and
   a second electronic subsystem configured to transmit the audio content received from the smartphone as an FM signal to the remote FM radio system of the vehicle, in accordance with one or more user playback commands input at the controls of the control panel.

2. The apparatus of claim 1, wherein the control panel includes an autolaunch control by which the apparatus is selectively configured to automatically launch an Internet radio program residing on the smartphone when the smartphone comes within a predetermined proximity of the apparatus.

3. The apparatus of claim 1, wherein the first electronic subsystem includes a wireless communications protocol transceiver that automatically establishes the wireless communications link with the smartphone when the smartphone comes within a predetermined proximity of the apparatus.

4. The apparatus of claim 1, further comprising a flexible power cord projecting from the housing, and having a memory construction adapted to remain in a user manipulated orientation.

5. The apparatus of claim 1, wherein:
   the second electronic subsystem further comprises:
      an FM modulator tunable to a desired FM frequency via a control on the control panel, to match a frequency that the remote FM radio system is tuned to;
   the first electronic subsystem comprises a wireless communications transceiver adapted to automatically establish the wireless communications link with the smartphone when the smartphone is placed within a predetermined proximity of the apparatus; and
   wherein the first electronic subsystem comprises a controller in communication with the FM modulator, the wireless communications transceiver and the control panel, the controller being configured to receive the audio content from the wireless communications transceiver and to convert the audio content to a modulated FM signal for transmission by the FM modulator to the remote FM radio system.

6. The apparatus of claim 1, wherein the control panel includes at least two of the following group of controls:
- a volume control;
- a frequency selection control;
- a play button to begin playing an available audio selection that has been received via the smartphone;
- a stop playback button;
- a pause playback button;
- a tag button enabling a user to mark at least one of a specific audio selection or a specific advertisement being listened to on the remote FM radio system with a designation, and wherein the designation is transmitted back to the smartphone for future use by the smartphone in taking further action, at a later time, with respect to the specific audio selection or specific advertisement tagged by the user;
- a call pickup button to pick up a call that has come in to the smartphone;
- a call disconnect button for disconnecting a call that is presently being received by the smartphone;
- a similar button for commanding the smartphone to search for similar audio content to a presently playing audio selection;
- a seek forward button for forwarding to a next audio selection within a plurality of available audio selections available for listening;
- a seek backwards button for selecting a previous audio selection within a plurality of available audio selections available for listening; and
- an autolaunch button that wirelessly sends a command to the smartphone to launch an Internet radio application residing on the smartphone.

7. The apparatus of claim 1, further comprising a cigarette lighter plug adapter adapted to plug into a cigarette lighter jack associated with the remote DC power source, to receive DC power from the remote DC power source.

8. An apparatus for wirelessly connecting a smartphone to a remote FM radio system of a vehicle, for playing back audio content delivered wirelessly to the smartphone via a wide area network, on the remote FM radio system, the apparatus comprising:
- a housing adapted to receive a DC power signal from a remote DC power source;
- a control panel having a plurality of controls for controlling the playback of the audio content on the remote FM radio system, at least one of the controls performing a function in common with a playback control appearing on a display of the smartphone;
- an FM modulator tunable to a desired FM frequency to match a frequency that the FM radio is tuned to;
- a wireless communications transceiver adapted to automatically establish a wireless communications link with the smartphone when the smartphone is placed within a predetermined proximity of the apparatus; and
- a controller in communication with the FM modulator, the wireless communications transceiver and the control panel, which is configured to receive the audio content from the wireless communications transceiver and to transmit the audio content as an equivalent modulated FM signal to the remote FM radio system for playback over the remote FM radio system.

9. The apparatus of claim 8, wherein the control panel includes a display system.

10. The apparatus of claim 8, wherein the control panel includes at least two of the following group of controls:
- a volume control;
- a frequency selection control;
- a play button to begin playing an available audio selection that has been received via the smartphone;
- a stop playback button;
- a pause playback button;
- a tag button enabling a user to mark at least one of a specific audio selection or a specific advertisement being listened to on the remote FM radio system with a designation, and wherein the designation is transmitted back to the smartphone for future use by the smartphone in taking further action, at a later time, with respect to the specific audio selection or specific advertisement tagged by the user;
- a call pickup button to pick up a call that has been received by the smartphone;
- a call disconnect button for disconnecting a call that is presently being received by the smartphone;
- a similar button for commanding the smartphone to search for similar audio content to a presently playing audio selection;
- a seek forward button for forwarding to a next audio selection within a plurality of available audio selections available for listening;
- a seek backwards button for selecting a previous audio selection within a plurality of available audio selections available for listening; and
- an autolaunch button that wirelessly sends a command to the smartphone to launch an Internet radio application residing on the smartphone.

11. The apparatus of claim 8, wherein the control panel includes an autolaunch control that wirelessly sends a command to the smartphone to launch an internet radio application residing on the smartphone.

12. The apparatus of claim 8, wherein the remote DC power source comprises a cigarette lighter jack of the vehicle, and the apparatus further comprises a cigarette lighter adapter plug for interfacing with the cigarette lighter jack of the vehicle to receive DC power from the cigarette lighter jack.

13. The apparatus of claim 8, further including a flexible power cord extending from the housing, the flexible power cord having a memory to maintain it in a user manipulated orientation such that the housing may be maintained in a user desired orientation.

14. The apparatus of claim 8, wherein the controller includes an control application configured to run thereon, the control application configured to control a transfer of packets of information and handshaking between the smartphone and the apparatus.

15. The apparatus of claim 8, wherein the housing further includes a USB port adapted to apply a USB charging signal to an external electronic device electrically connect to the USB port.

16. The apparatus of claim 8, wherein the housing further comprises at least one of a line-in port and a line-out port, in communication with the controller communicating analog audio content at least one of to the controller from an external device, or from the controller to the external device.

17. A method for wirelessly connecting a smartphone to a remote FM radio system of a vehicle, for controlling a playback of audio content delivered wirelessly to the smartphone via a wide area network, on the remote FM radio system of the vehicle, the method comprising:

using a housing having a power cord to receive a DC power signal from a remote DC power source supplied by the vehicle;

using a device having a control panel with a plurality of controls, and a display, to control the playback of the audio content on the remote FM radio system, at least one of the controls performing a function in common with a playback control appearing on a display of the smartphone;

establishing a first wireless communications link between the smartphone and the device to receive audio content from the smartphone, which the smartphone has received over the wide area network; and establishing a second wireless communications link in a form of an FM signal transmitted from the device to the remote FM radio system, and using the second wireless communications link to enable the device to transmit the audio content as an FM signal to the remote FM radio system for playback using the remote FM radio system.

18. The method of claim 17, further comprising providing the device with an Auto Launch input selection that enables a wireless command signal to be automatically sent from the device to the smartphone when the device is powered on, which automatically causes the smartphone to launch an Internet radio program residing on the smartphone.

19. The method of claim 17, further comprising enabling the plurality of controls on the device to control a plurality of functions on the smartphone via the first wireless communications link.

20. The method of claim 17, further comprising configuring the plurality of controls to include two or more of the following group of controls:

a volume control;
a frequency selection control;
a play button to begin playing an available audio selection that has been received via the smartphone;
a stop playback button;
a pause playback button;
a tag button enabling a user to mark at least one of a specific audio selection or a specific advertisement being listened to on the remote FM radio system with a designation, and wherein the designation is transmitted back to the device for future use by the device in taking further action with respect to the specific audio selection or specific advertisement tagged by the user, at a later time;
a call pickup button to pick up a call that has come in to the smartphone;
a call disconnect button for disconnecting a call that is presently being received by the smartphone;
a similar button for commanding the smartphone to search for similar audio content to a presently playing audio selection;
a seek forward button for forwarding to a next audio selection within a plurality of available audio selections available for listening;
a seek backwards button for selecting a previous audio selection within a plurality of available audio selections available for listening; and
an autolaunch button that wirelessly sends a command to the smartphone to launch an Internet radio application residing on the smartphone.

* * * * *